United States Patent
Wolfgang et al.

(10) Patent No.: US 8,188,385 B2
(45) Date of Patent: May 29, 2012

(54) DETERMINATION OF THE MASS OF A VEHICLE

(75) Inventors: Werner Wolfgang, Ravensburg (DE);
Maik Würthner, Friedrichshafen (DE);
Ingo Sauter, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 280 days.

(21) Appl. No.: 12/530,523

(22) PCT Filed: Mar. 7, 2008

(86) PCT No.: PCT/EP2008/052772
§ 371 (c)(1),
(2), (4) Date: Sep. 9, 2009

(87) PCT Pub. No.: WO2008/119616
PCT Pub. Date: Oct. 9, 2008

(65) Prior Publication Data
US 2010/0108406 A1    May 6, 2010

(30) Foreign Application Priority Data
Mar. 30, 2007    (DE) .......................... 10 2007 015 356

(51) Int. Cl.
*G01G 19/08* (2006.01)
(52) U.S. Cl. ........................................ 177/136; 702/174
(58) Field of Classification Search .......... 177/136–139, 177/141; 702/101, 102, 173, 174; 73/117.03
See application file for complete search history.

(56) References Cited

U.S. PATENT DOCUMENTS

| | | | | |
|---|---|---|---|---|
| 4,313,510 A * | 2/1982 | Tomlinson, Jr. | ............... | 177/165 |
| 4,635,739 A * | 1/1987 | Foley et al. | .................... | 177/141 |
| 4,832,141 A * | 5/1989 | Perini et al. | ..................... | 177/141 |
| 5,182,712 A * | 1/1993 | Kyrtsos et al. | .................. | 701/50 |
| 5,410,109 A * | 4/1995 | Tarter et al. | ..................... | 177/136 |
| 5,478,974 A * | 12/1995 | O'Dea | ......................... | 177/25.14 |
| 5,831,343 A * | 11/1998 | Nakazaki | ..................... | 307/10.1 |
| 6,339,749 B1 | 1/2002 | Rieker et al. | | |
| 6,633,006 B1 | 10/2003 | Wolf et al. | | |
| 6,636,820 B2 * | 10/2003 | Livingston | .................... | 702/101 |
| 2004/0176889 A1 | 9/2004 | Capito | | |

FOREIGN PATENT DOCUMENTS

| | | |
|---|---|---|
| DE | 42 28 412 A1 | 3/1994 |
| DE | 198 02 630 A1 | 9/1999 |
| DE | 198 37 380 A1 | 2/2000 |
| DE | 100 58 045 A1 | 6/2001 |
| DE | 10 2004 006 696 A1 | 6/2005 |
| DE | 10 2004 019 624 B3 | 12/2005 |
| EP | 1 139 078 A2 | 10/2001 |

* cited by examiner

*Primary Examiner* — Randy W Gibson
(74) *Attorney, Agent, or Firm* — Davis & Bujold, P.L.L.C.

(57) ABSTRACT

A method and device for provisionally determining the mass of a vehicle when it is initialized. After initialization of the vehicle, the method determines a vehicle mass value by a static mass determination method and then checks whether this value is within a predetermined tolerance band around the dynamically last-determined vehicle mass value, which has been stored for that purpose. If this is so, and there has in the meantime been no significant change of the vehicle's mass, the previously stored dynamic vehicle mass value is probably more accurate and is used in the determination. Otherwise it can be assumed that the vehicle mass value has changed substantially, and the statically determined vehicle mass value is therefore used until a device for the dynamic determination of a vehicle mass can supply a more accurate vehicle mass value after a short time.

13 Claims, 1 Drawing Sheet

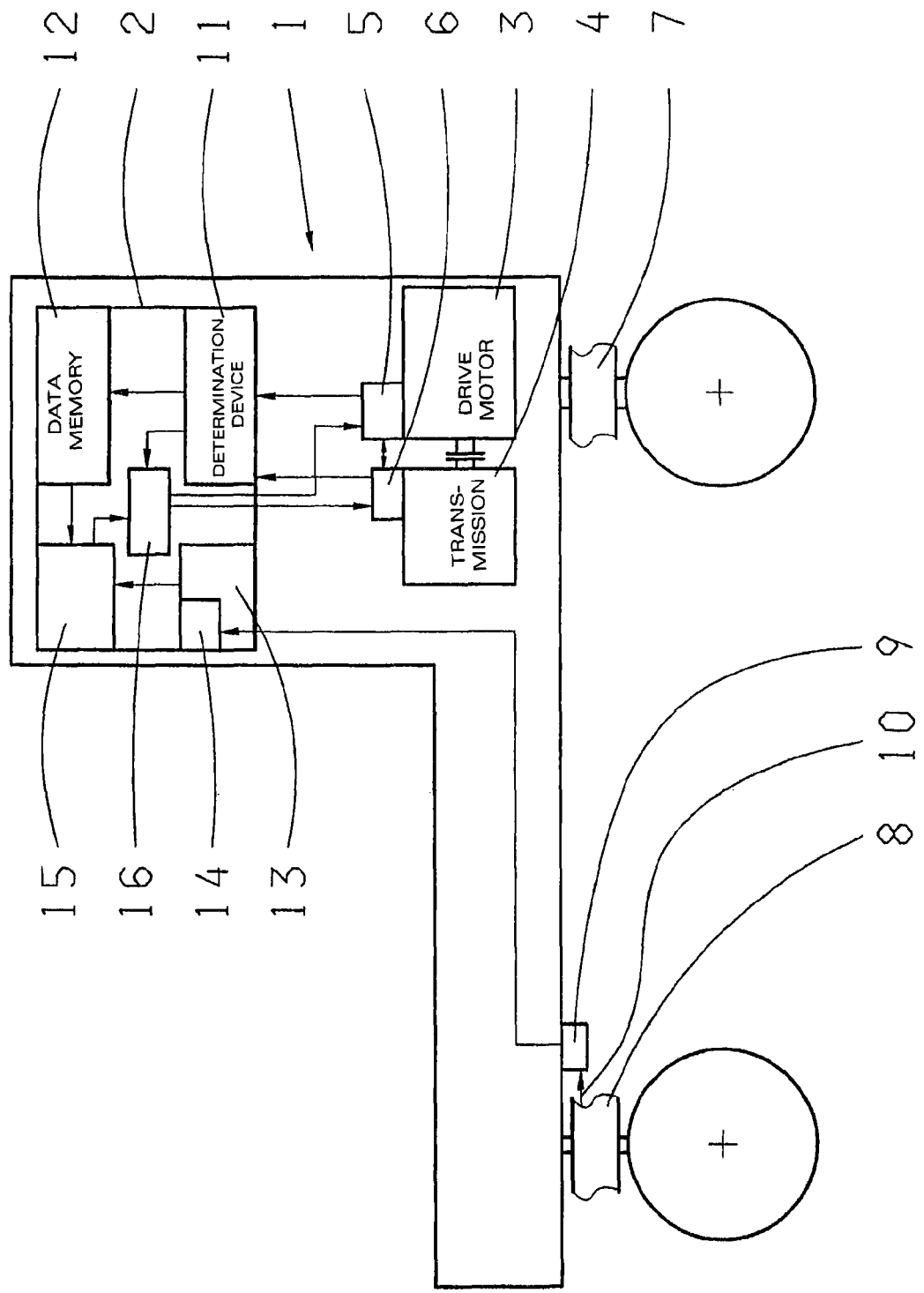

DETERMINATION OF THE MASS OF A VEHICLE

This application is a national stage completion of PCT/EP2008/052772 filed Mar. 7, 2008 which claims priority from German application serial no. 10 2007 015 356.4 filed Mar. 30, 2007

FIELD OF THE INVENTION

The invention concerns a method for the provisional determination of the mass of a vehicle during its initialization in accordance with the preamble of claim 1, and a device for implementing the method according to claim 10.

BACKGROUND OF THE INVENTION

Determining the mass of a vehicle and especially a utility vehicle is useful for many reasons. It can serve to determine the total weight of the vehicle and, for example, compare that with a highest admissible total weight. Furthermore, by subtraction of a known unladen vehicle weight or a total weight determined earlier, the weight of the load or the load change can be determined, and of course conversely, the total weight can be determined from the known unladen weight and a determined load. This enables evaluation related to legal provisions, such as in relation to a maximum admissible axle load or a maximum permissible total vehicle weight, and/or in relation to technical and design load limits.

Moreover, the value of the vehicle's mass or weight can also be needed as an essential input magnitude for control and/or regulation devices of the vehicle, which for example influence the operation of the drive motor, the transmission, the brake system and/or stabilizing devices. In vehicles with modern, automated manual transmissions it is desirable, for example, to select gear to be engaged, not only with reference to the known performance parameters of the drive motor and drivetrain, the vehicle's driving speed and the desired acceleration, but also as a function of the total mass of the vehicle, since if a vehicle is heavily loaded, substantially higher torques and therefore lower gears and higher engine speeds are needed for a desired acceleration, and in addition, for example uphill stretches also exert a greater influence on an optimum gear to be selected as the vehicle's mass increases, whereas the influence of wind gusts on the vehicle decreases as the vehicle's mass increases.

To determine the vehicle's mass it has long been known to use weighing devices external to the vehicle. However, these are often not available and are also relatively expensive and time-consuming to use, and/or they are at fixed locations and must therefore first be sought out, which is troublesome.

Furthermore, it is known for example from DE 100 58 045 B4 to determine the vehicle's mass with the help of devices on the vehicle itself, which rely on determining the weight force between the sprung and unsprung masses of the vehicle. More precisely, from the above document it is known, in the case of trucks, to measure the bearing load of the sprung vehicle parts directly or indirectly on all the axles or at least on several axles relatively far apart in relation to the vehicle's length, in order to determine from this the loading or, taking into account the known mass of the unsprung parts of the vehicle, the total weight of the vehicle. Of course, alternatively or in addition to this, and usually assuming a horizontal vehicle supporting area, the part-masses resting on each individual axle are determined, for example in order to determine the weight or mass distribution of the load.

Other solution approaches determine the supported weight at other points, for example, by evaluating the tire pressure or the pressure between a vehicle chassis and a container carrying the payload, such as a freight container, a liquid tank or a tilting container of a dump truck. The common feature of most such approaches is that a physical magnitude correlated with the mass to be determined is measured at several points geometrically separated from one another, such that the mass to be determined rests at least almost completely on the measurement points. For this purpose, for example, the pneumatic pressure in air-sprung elements of a front and a rear axle carrying the load can be determined.

In particular, for this purpose solutions are known, in which for example the pneumatic pressure at four points associated with the corners or the wheels of the vehicle is measured. To reduce the complexity of the apparatus required, simplified versions of this basic variant provide that for each axle or for each side of the vehicle, instead of separate pressure values only a mean pressure value is determined, since for example the left-hand and right-hand suspension of an axle or the front and rear suspension elements on one side of the vehicle are temporarily interconnected for measurement purposes.

If it is assumed as an approximation that under the usual measurement conditions the vehicle is about equally heavily loaded on each side of its longitudinal axis and is standing on a surface level enough for measurement purposes, it is sufficient for the pressure to be measured only on one side of the axles without interconnecting the suspension elements. Moreover, if the distribution of the carried load between several axles of an axle group is known, then instead of determining load values for all the axles of the axle group a measurement can be made on only one of the axles, and taking into account the assumed load distribution, the axle loads can be calculated from the value so obtained.

Such systems, which rely on a weight or pressure measurement while the vehicle is at rest, however, are subject to certain disadvantages in principle: when at least two force measurement devices are provided on different axles or at points of the vehicle remote from one another, this increases the cost and complexity of the equipment, namely the force measurement sensors, the wiring and the evaluation devices. As the number or force measuring devices increases this expenditure rises approximately proportionally, while at the same time the maintenance effort and the probability of failure increase. In addition, many trucks have leaf springs on their front axle, whose springs deform with increasing load not continuously but jerkily because of the friction between them, and so render any force measurement based on a path measurement of the spring deflection really inaccurate. However, the more the system is simplified, for example by taking physical measurement values only at individual axles or on one side of the vehicle, the more severely is the mass value determined on that basis affected by uncertainty and error.

From DE 10 2004 019 624 B3 an axle measurement unit for pneumatic and mechanical suspensions is known, which enables the total weight or the loading of a vehicle to be determined by measuring only one axle load or the bellows pressure of a pneumatic suspension bellows of one axle. For this purpose a load/sensor-signal diagram is determined, in that in a loaded and unloaded condition of the vehicle the bearing load determined by at least one sensor on an axle (for example the bellows pressure of a pneumatic suspension) is measured and correlated with known loads. By virtue of the support points of a characteristic line so determined, and on the assumption that the relationship is linear, any sensor value obtained or any bellows pressure of the pneumatic suspension bellows can be associated with a particular weight or load. To improve accuracy, additional support points can be determined so that even a non-linear relationship between the bellows pressure and the load can be represented with greater accuracy.

Compared with the systems described earlier, this known axle load measurement unit involves the least complex and costly equipment and therefore enables a determination of relevant vehicle masses sufficiently accurate for many purposes, for comparatively little cost. However, the determination of mass with the help of a weight measured on only one axle or even only one side of an axle is subject to major uncertainties in principle.

Finally, systems for determining vehicle mass are known, which are based on the evaluation of drive-dynamic parameters. Thus for example, according to a method disclosed in DE 198 37 380 A1 a traction force magnitude, in particular the time integral of the traction force, and a movement magnitude, in particular the change of speed, are determined during a traction-force-free phase and a traction-force phase of driving operation. This method has the advantage that no additional force or pressure sensors at all are needed, because all the raw data required are in any case available in suitable form in a modern motor vehicle for use in other vehicle systems. Accordingly, no or only very little additional wiring cost and complexity is involved and the probability of failure is independent of the number of axles.

This measurement variant, however, is especially advantageous in that with little cost it provides a signal that is very accurate in relation to the purpose intended: in particular, for the control of a transmission and motor it is not decisive how large the physical mass of the load is, but rather how large the driving resistance of the vehicle which, for example, results from a combination of the air resistance, the rolling resistance, the vehicle's mass and the inclination of the road are. In turn, the air resistance is a combination of the vehicle's air resistance coefficient, its cross-sectional area, the air density and the incident air flow speed, the latter itself depending on the driving speed and the wind situation at the time. The rolling resistance depends on the type and number of tires, the tire pressure, the suspension, the mass carried and the road surface properties.

The method proposed in DE 198 37 380 A1 takes all these components into account, in that only two relevant magnitudes are determined and set in proportion to one another, and is therefore in principle far superior to any method that seeks to control a drive motor and/or a transmission on the basis of a determined vehicle mass alone. The essential disadvantage of this method, however, is that at the moment of starting off after a substantial change in the loading of the vehicle, no mass change data related to this are yet available. Especially in the case of trucks this can restrict the utility of the method.

Essentially, in the case of trucks it can be assumed that if the loading or total vehicle weight is to be changed substantially, the vehicle must be at rest. True, there are special cases such as asphalt tippers or sprinklers, but in the latter case the weight reduction during operation takes place so slowly that a method such as the one described above can react to it without problems. Moreover, at least unless only small part-quantities of the load are concerned, loading and unloading are almost exclusively carried out while the vehicle's motor is switched off. Nevertheless, when starting off after the vehicle has been at rest, in most cases it is possible without problems to use the last vehicle mass value determined by a dynamic method for controlling the drive motor and an automated transmission.

Despite this, however, particularly once the vehicle's ignition has been turned off, the possibility exists that the previously determined vehicle mass or loading will differ so considerably from a value determined and stored earlier, that the starting-off process cannot be controlled or regulated with sufficient, or with the desired accuracy.

SUMMARY OF THE INVENTION

Against this background the purpose of the present invention is to propose a method for the provisional determination of the mass of a vehicle when it is restarted or when the vehicle is initialized, which can take full advantage of the benefits of a dynamic mass determination without suffering the disadvantages described earlier. The method should also be able to be operated with the least possible structural expenditure, and should not be sensitive to interference.

The invention is based on the recognition that with a dynamic method for determining vehicle mass, in most cases the vehicle mass last determined can be used and only in cases when a considerable change in the vehicle's weight has taken place since the vehicle was last stopped, is it necessary after starting the vehicle to determine the current vehicle mass in some other way.

Accordingly, the invention starts from a method for the provisional determination of a vehicle's mass when it is initialized, where the term initialization is understood to mean mainly turning on the ignition and the resultant activation of the control units involved in the method. Only in exceptional cases does it happen that the control units involved do not shut down when the ignition is switched off, since they may sometimes have to perform other functions which should remain available even when the ignition is switched off. Moreover, it can happen that a vehicle is unloaded even with the motor running or at any rate with the ignition still on. In such a case the vehicle's initialization is taken to be a process immediately preceding the putting of the vehicle into operation or the beginning of its movement, such as the starting of the vehicle's drive motor or the actuation of a particular operating element by the driver. It can also be provided that initialization begins after the lapse of a predetermined time period in which the vehicle has been at rest, either automatically or when the driver actuates a particular operating element.

In the present context the vehicle comprises a control unit which can determine a current vehicle mass value on the basis of dynamic movement data such as the acceleration of the vehicle or its time variations. Depending on the application, the current vehicle mass value can be understood to mean a determined value of the vehicle's total mass, including its load. However, it is also possible instead or in addition, to determine the weight of the load or even the weight of the spring supported mass.

Since, as is known, the mass and weight of a specific body on land are related by the gravitational acceleration constant and even, in the case of partially immersed vehicles, can be calculated easily by additionally taking into account the displaced volume and its specific density, here and in what follows no distinction will be made between the mass and the associated weight force. Also, the unladen weight of vehicles is usually known accurately enough to allow determination of the vehicle's load by simple subtraction of the unladen weight from the total weight of the vehicle. Moreover, precisely in the context of determining an axle load value it is usual to provide a physical sensor between parts of the body supported by springs and those that are not. Since the mass of the parts of the vehicle that are not supported by springs is largely constant, these values can be derived from one another by simple addition or subtraction. Thus, different expressions relating to this represent equivalent solutions and should be regarded as falling entirely within the scope of the protection claimed here.

Further, it is provided that the control unit stores in a data memory, which can optionally even be part of the control unit itself, the last dynamically determined vehicle mass value when the vehicle is de-initialized, i.e. in most cases when the ignition is switched off, and that when or immediately after the vehicle is initialized, the control unit reads in again the last-determined dynamic vehicle mass value stored in the data memory, and uses it for further tasks.

To achieve the stated objective it is provided that in addition, the control unit determines the axle load of at least one rear axle of the vehicle by means of a static method, in that it reads in at least one physical measured value which correlates with the axle load and on the basis thereof determines a statistically determined vehicle mass value. In this, of course, it is basically possible to use any known means for static axle load determination, i.e. a determination carried out when the vehicle is at rest.

Analogously to the remark regarding vehicle mass value made earlier, it is again unimportant here whether a mass value is determined in specific form or, as is usual, a weight force or a pressure in the physical sense is determined. Likewise, the axle load is optionally understood to mean either a value measured between an axle and a spring supported body of the vehicle, or a value exerted by the axle toward the ground beneath it, or a value exerted under the axle on the ground.

When, as is usual, the proportional share of the vehicle's unsprung mass carried on one axle is known, these values can easily be converted one to another and can therefore be regarded as equivalent in the context of these explanations. Thus for example, for a given vehicle, the axle load determined between the rear axle and the spring supported body, which can be determined perhaps by a pressure sensor on the support-block of the spring of a wheel suspension, can easily be increased by the proportional mass of the chassis not spring supported, for example by 600 kg, whereby the value obtained is the same as that which would result from a determination of the axle load on the contact area of the tires on the axle. Likewise, for example in the case of a dumper truck, it is possible and appropriate to determine a load change not in the area between the masses supported and unsupported by springs, but rather, for example, from the hydraulic pressure needed to raise the tilting container and thus between the tilting body and the base frame.

Finally, here and in what follows, the term rear axle should be understood purely functionally in relation to the present purposes, and of course also applies correspondingly to vehicles with rear shafts or individual wheel suspension. In particular, the rear axle here is not to be understood in every case as the rearmost axle of a vehicle, but rather, as an axle whose axle load, when the vehicle is used in the appropriate manner, is substantially influenced by a load change. Thus, in a vehicle with a semi-trailer, which has a steered front axle, two rear axles of the tractor vehicle and three rear axles of the semi-trailer, all the axles except for the foremost axle can be used for determining a statically measured, current mass value of the vehicle. In special cases, for example in many special mining vehicles, it can even happen that the vehicle is designed to carry considerable payloads in the area of the foremost axle. In such a case it could even be that the foremost axle of the vehicle counts as a rear axle for the purposes of the invention.

Since the number of positions considered for the determination of relevant magnitudes, in combination with the large variety of vehicle designs, would make it very difficult to understand the essential features of the method according to the invention, here and in what follows the terms mass, axle load and rear axle will be used in the very broad sense defined earlier.

Furthermore, it is decisive for the method according to the invention that the control unit reads in at least one physical measured value that corresponds with the axle load and on the basis thereof, if necessary after appropriate conversion to a uniform reference magnitude or other preparatory processing, generates a statically determined vehicle mass value and compares it with the vehicle mass value last determined dynamically and read from the memory, and in the event that the statically determined vehicle mass value deviates from the last vehicle mass value determined dynamically by more than a predetermined tolerance range, adopts the statically determined vehicle mass value as the relevant vehicle mass value, and otherwise uses the last vehicle mass value determined dynamically as the relevant vehicle mass value.

In this way, with the least possible equipment cost and complexity it can be ensured that after a substantial change of the vehicle's mass due to loading or unloading, the system does not work using the previously determined dynamic mass value until the control unit has had the opportunity to correct this by suitable dynamic measurements. In particular, for the first start-off process after a substantial change of the vehicle's loading a usable mass value is available for selecting an optimum starting gear from among several possible starting gears of the transmission.

At the same time, in this way the effort for determining the static measured value can be minimized as much as possible, since in any case this is only done in the described special case of a substantial load change and even then it is replaced by the new, dynamically determined mass value after a very short time. As already explained, in any case the last mass value is considerably better suited for the purposes of drive-dynamics control and regulation of vehicle aggregates and driving stability functions.

Correspondingly, it makes sense from the economic standpoint for the control unit to determine the static vehicle mass value on the basis of data from at most two sensors, which are arranged essentially on a common horizontal perpendicular to the longitudinal axis of the vehicle and which, as a rule determine the bearing load of a rear axle of the vehicle. The details of an example of a possible vehicle mass value determination with the help of the axle load on only one vehicle axle have already been described earlier.

However, if the control unit determines the static vehicle mass value on the basis of data from at least one sensor located either in the area of the foremost of all the rear axles, or in the area of the bearing surface of a semi-trailer, or in the foremost area of a container carrying the payload, this offers the additional advantage that the wiring or radio transmission paths are as short as possible. Particularly in tractor vehicles for semi-trailers the entire sensor system can be accommodated on the tractor and will then function with any kind of semi-trailer without conversion or refitting.

A particularly simple and robust possibility for determining a static vehicle mass value, is when the at least one sensor is a pressure-sensitive sensor, since in the load range required a wide selection of adequately robust such sensors are available at favorable prices. Especially suitable are piezoelectric pressure sensors, since because of their properties and their small size these can be mounted or refitted at almost any desired points without having to adapt elements of the chassis, the suspension or the body more than minimally for the purpose.

However, when an axle or body suspension based on pneumatic spring elements is present, then a pressure sensor can be used to at least equally advantageous effect, which determines a pressure in at least one pneumatic suspension element of the vehicle.

Since—because the spring contact area varies over the load range of a pneumatic spring, and sometimes also because of other effects such as temperature influence—the sensor value determined by such a pneumatic pressure sensor is in most cases non-linear, in this case it is particularly advantageous for the control unit to determine a corrected pressure value that takes into account at least a contact area in the pneumatic spring element which changes with the pressure. In practice this can be done easily by means of a table with corresponding correction values.

Since trailers carrying heavy loads in particular usually have at least two separate axles and such a trailer, when the vehicle is at rest, cannot be detected by an additionally applied force for example in the form of a supporting load, it is precisely for trucks with a trailer coupling that it makes sense for the control unit also to check, at least during the initialization defined earlier, whether a trailer has been coupled to the tractor vehicle or has been decoupled from it.

This, for example, can be done particularly simply if, when the system is de-initialized, the fact of whether or not a trailer is coupled to the tractor is stored in memory. This stored condition is then compared with the condition found during a later initialization of the system. The actual detection can be done simply, for example by a sensor on the trailer coupling, or better still by evaluating the power supply cables to the trailer. Of course other detection methods are possible, for example the transmission by wire or wirelessly of a characteristic which may, for example contain the classification of the trailer in terms of its usual or maximum weight or load.

If the trailer is equipped with a system for determining its own trailer mass value, provision should of course be made for transmitting this current trailer mass value to the relevant control unit of the tractor vehicle and taking it into account when determining the overall vehicle mass.

If the control unit detects that a trailer is coupled but the trailer does not communicate any trailer mass value of its own, the accuracy of the statically determined mass value for the vehicle as a whole can nevertheless at least be improved if the vehicle mass value determined in such a case is increased by a predetermined or preselectable, trailer-related mass value.

For example, for an ordinary truck the mass value can be increased at least by a usual, average unladen weight of a tow-bar trailer. However, it is even more appropriate if the driver, by manual inputs to the control unit, can adopt an added value which can either be input to a specific weight unit or, for example with the help of symbols, can be adapted in an adjustment element with several switch positions. When goods of relatively low density are transported on a regular basis, this operating element can remain set at a value adopted once and for all. But if the weight of the towed trailer varies markedly, then the driver can if necessary still ensure a sufficiently accurate determination of the vehicle's mass with the help of a simple handle.

Below, a device for implementing the method explained above will be described.

In a vehicle equipped for implementing the method according to the invention, a control unit is present which comprises a device for the dynamic determination of a vehicle mass value on the basis of read-in dynamic movement data of the vehicle. In the vehicle and preferably in the control unit itself there is also a data memory, in which the last dynamically determined vehicle mass value can be stored when the control unit is de-initialized.

Further, the control unit is designed such that when or immediately after it is initialized, the previously stored, last-determined dynamic vehicle mass value can be read out of the data memory into a comparison device of the control unit.

Furthermore, at least one sensor for determining an axle load of at least one rear axle of the vehicle is present and is so connected to the control unit so as to transmit signals enabling the control unit to read in the sensor value. The control unit also comprises an evaluating device for computing a statically determined vehicle mass value on the basis of the sensor value read in.

The statically determined vehicle mass value is also sent to the comparison device of the control unit, which is designed to determine whether a read-in dynamic mass value and a determined static mass value are within a predeterminable tolerance band. This is ultimately a question of how far apart the values are in absolute or percentage terms, so that instead of a definition of a tolerance band around the dynamically determined vehicle mass value, a tolerance band around the dynamically determined vehicle mass value can of course also be defined.

The control unit is also designed such that if one of the vehicle mass values lies within the tolerance band of the respective other vehicle mass value, the last dynamically determined vehicle mass value is adopted, and otherwise the statically determined vehicle mass value is used as the relevant vehicle mass value and transferred to an output device to enable access to other control units.

Finally, at least one other control unit is provided, which can read this relevant mass value out of the control unit, until the control unit or the device for the dynamic determination of a vehicle mass value is in a position to provide a dynamic mass value which is more accurate or more useful.

Basically, the method proposed and the associated device can also be used advantageously with railway vehicles and passenger cars. However, they are particularly useful in the case of vehicles whose loads can vary markedly compared with their unlade weight, in particular trucks and more particularly still, heavy trucks.

Since precisely such vehicles often have pneumatic suspension in the area of the rear axles, it is advantageous for the at least one sensor for determining an axle load of at least one rear axle of the vehicle to be a pressure sensor for determining an internal pressure of a pneumatic suspension element.

For the reasons already explained, it is also appropriate here for the control unit to comprise a correction device which can compensate the influence of a bearing cross-section that varies with the pressure of a pneumatic suspension element.

BRIEF DESCRIPTION OF THE DRAWINGS

The invention can be explained further with reference to an example embodiment. For this purpose the description of a drawing is attached.

The sole FIGURE shows, diagrammatically and in a very simplified way, the structure of a device for implementing the method according to the invention.

DETAILED DESCRIPTION OF THE DRAWINGS

The FIGURE shows a symbolically represented vehicle 1 in the form of a truck, with a control unit 2, a drive motor 3 and an automated change-speed transmission 4. The drive motor 3 is controlled by an engine control unit 5 and the automated transmission 4 is controlled by a transmission control unit 6, which—as represented symbolically by a double arrow—are in a mutual data exchange relationship. Further, the truck 1 has front and rear pneumatic suspensions 7 and 8, and only the rear pneumatic suspension 8—looking in the forward driving direction—has a sensor 9 connected to it by a pressure line 10 to measure the axle load, the sensor in this case being made as a pneumatic pressure sensor 9.

The control unit 2 comprises a device 11 for the dynamic determination of a vehicle mass value, which computes the same on the basis of data from the motor control unit 5 and the transmission control unit 6 in a known manner. Here too, the associated data connections are indicated by arrows. When the vehicle 1 and the control unit 2 are de-initialized, the dynamic vehicle mass value last determined is stored in a data memory 12.

When the vehicle 1 and control unit 2 are initialized, on the basis of a value of the axle load determined by the sensor 9, a static vehicle mass value is computed by a device 13 for forming a statically determined vehicle mass value, which is present in the control unit 2. To put it more exactly, the pressure signal from the sensor 9 is first cleared in a correction unit 14 from known effects based on the change in the contact surface of the rear pneumatic suspension 8 with varying pressure.

A comparison device 15 reads the last-determined dynamic vehicle mass stored in the data memory 12 and the static vehicle mass value computed in the device 13 for forming a statically determined vehicle mass value, and determines whether the static vehicle mass value agrees with the dynamic vehicle mass value to within a fixed, predetermined tolerance band of ±15% in the present example.

If this is the case, it can be assumed that the mass of the vehicle 1 has changed only insubstantially since de-initialization. In that case, the comparison device 15 transmits the dynamically determined vehicle mass value to an output device 16, which makes that value available for example to the motor control unit 5 and to the transmission control unit 6.

If, however, the difference between the dynamically determined vehicle mass value and the statically determined vehicle mass value is larger than ±15% in the present example, then the vehicle's mass can be assumed to have changed substantially, so the comparison device 15 transmits the statically determined vehicle mass value to the output device 16.

As soon as, during later driving operation, the device 11 for the dynamic determination of a vehicle mass value has determined a more accurate vehicle mass value, it transmits the dynamically determined vehicle mass value to the output device 16, which passes it on to the motor control unit 5 and the transmission control unit 6.

In this way, with little equipment expenditure and computation effort a vehicle mass value is always available, which is suitable for the control, for example, of the motor control unit 5 and the transmission control unit 6.

The respective vehicle mass values, whether now determined statically or dynamically, are preferably fed into a databus system such as a CAN bus so as to be available for other control units as well to carry out their control and regulation functions, for example tasks relating to driving stability and/or drive-slip regulation.

Indexes
1 Vehicle, truck
2 Control unit
3 Drive motor
4 Automated change-speed transmission
5 Motor control unit
6 Transmission control unit
7 Front pneumatic suspension
8 Rear pneumatic suspension
9 Sensor, pneumatic pressure sensor
10 Pressure line
11 Device for the dynamic determination of a vehicle mass
12 Data memory
13 Device for the static determination of a vehicle mass
14 Correction device
15 Comparison device
16 Output device

The invention claimed is:

1. A method for provisional determination of a mass of a vehicle (1) on initialization, in which the vehicle (1) comprises a control unit (2) which, on a basis of dynamic movement data of the vehicle (1), determines a current vehicle mass value, and the control unit storing a last dynamically determined vehicle mass value in a data memory (12) when the control unit (2) is de-initialized, and either on or immediately after the initialization of the control unit (2), the control unit (2) reads in the last-determined dynamic vehicle mass value stored in the data memory, the method comprising the steps of:
storing the last dynamically determined vehicle mass value in the data memory (12) when the control unit (2) is being de-initialized;
determining an axle load of at least one rear axle of the vehicle (1), with the control unit (12), using a static method by reading in the last dynamically determined vehicle mass value, that correlates with the axle load of the at least one rear axle, either on or immediately after the initialization of the control unit (2);
determining a statically determined vehicle mass value on a basis of the last dynamically determined vehicle mass value;
comparing the statically determined vehicle mass value with the last dynamically determined vehicle mass value;
adopting the statically determined vehicle mass value as the relevant vehicle mass value, if the statically determined vehicle mass value differs by more than a predetermined tolerance range from the last dynamically determined mass value; and
defining the relevant vehicle mass value as the last dynamically determined vehicle mass value, if the statically determined vehicle mass value is within the predetermined tolerance range.

2. The method according to claim 1, further comprising the step of determining, with the control unit (2), the statically determined vehicle mass value based on data from at most two sensors (9) which are arranged essentially on a common horizontal perpendicular to a longitudinal axis of the vehicle (1).

3. The method according to claim 1, further comprising the step of determining, with the control unit (2), the statically determined vehicle mass value based on data from at least one sensor (9), which is located either in an area of a foremost rear axle, in an area of a bearing surface of a semi-trailer, or in an foremost area of a container carrying a payload.

4. The method according to claim 1, further comprising the step of utilizing a pressure-sensitive sensor as the at least one sensor (9).

5. The method according to claim 4, further comprising the step of utilizing a piezoelectric pressure sensor as the sensor (9).

6. The method according to claim 4, further comprising the step of utilizing a pressure sensor, which determines a pressure in a pneumatic suspension element (8) of the vehicle, as the sensor (9).

7. The method according to claim 6, further comprising the step of determining a corrected pressure value, with the control unit (2), based on a sensor value determined by the pressure sensor (9) and giving consideration to a contact area in the pneumatic suspension which varies with pressure.

8. The method according to claim 1, further comprising the step of, at least on initialization, checking whether a trailer has been one of coupled to or decoupled from the vehicle, with the control unit (2), and whether a mass value of the trailer is available, and, if the trailer mass value is present, taking into account the mass value of the trailer in the determination of the vehicle mass value.

9. The method according to claim 8, further comprising the step of increasing the determined vehicle mass value, with the control unit, by one of a predetermined or preselectable, trailer-related mass value, if the control unit (2) detects that the trailer has been coupled on and the trailer does not communicate the trailer mass value of the trailer.

10. A device for implementing a method of determining a mass of a vehicle (1) on activation of a control unit (2), the control unit (2) being activated by turning on an ignition of the vehicle, the device comprising:
the control unit (2) comprising a device (11) for repeatedly determining a dynamic vehicle mass value which is based on read-in dynamic movement data of the vehicle (1) which is read in while the control unit (2) is activated;
a data memory (12) for storing a last of the dynamically determined vehicle mass value when the control unit is deactivated, the control unit being deactivated by turning off the ignition of the vehicle;
the control unit (2) being designed such that when or immediately after the control unit (2) is reactivated, the last dynamically determined vehicle mass value that was stored when the control unit was deactivated is read from the data memory (12) into a comparison device (15) of the control unit (2);
at least one sensor (9) for determining an axle load of at least one rear axle of the vehicle and the sensor (9) being in signal-transmitting connection with the control unit (2) such that a device (13) of the control unit (2) for static determination of a static vehicle mass value reads in a sensor value from the sensor (9);
the control unit (2) being designed such that the static vehicle mass value previously determined by the device for statically determining the static vehicle mass value, is also read into the comparison device (15) of the control unit (2);
the comparison device (15) determines whether the static vehicle mass value determined is within a predeterminable tolerance band around the read-in last dynamically determined vehicle mass value;
the control unit having an output device (16) such that if the static vehicle mass value is within the tolerance band, the last dynamically determined vehicle mass value is transmitted as a relevant mass value to the control unit (2), and if the static vehicle mass value is outside the tolerance band, the statically determined vehicle mass value is transmitted as the relevant mass value to the control unit (2); and
the relevant mass value is held in readiness by either the control unit (2) or the output device (16), to be read out by at least one other control unit (5, 6), until the device (11) for the dynamic determination of the vehicle mass value is available to supply an updated dynamic mass value.

11. The device according to claim 10, wherein the vehicle (1) is a truck (1).

12. The device according to claim 10, wherein the sensor (9) for determining an axle load of at least one rear axle of the vehicle (1) is a pressure sensor (9) for determining an internal pressure of a pneumatic suspension element (8).

13. The device according to claim 1, wherein the control unit (2) comprises a correction device (14), which is compensates for an influence of a bearing cross-section that varies with a pressure of a pneumatic suspension element (8).

* * * * *